United States Patent
Nosaka

(10) Patent No.: US 8,213,763 B2
(45) Date of Patent: Jul. 3, 2012

(54) VIDEO DATA COPYING APPARATUS, VIDEO DATA COPYING METHOD, RECORDING MEDIUM, AND INTEGRATED CIRCUIT

(75) Inventor: Masafumi Nosaka, Osaka (JP)

(73) Assignee: Panasonic Corporation, Osaka (JP)

( * ) Notice: Subject to any disclaimer, the term of this patent is extended or adjusted under 35 U.S.C. 154(b) by 938 days.

(21) Appl. No.: 12/180,007

(22) Filed: Jul. 25, 2008

(65) Prior Publication Data

US 2009/0028513 A1    Jan. 29, 2009

(30) Foreign Application Priority Data

Jul. 27, 2007    (JP) .................................. 2007-195383

(51) Int. Cl.
*H04N 5/91* (2006.01)
(52) U.S. Cl. ........... 386/52; 386/237; 386/291; 386/341
(58) Field of Classification Search .................... 386/52, 386/237, 291, 341
See application file for complete search history.

(56) References Cited

U.S. PATENT DOCUMENTS

| 7,463,815 | B2 | 12/2008 | Takeuchi |
| 2005/0117877 | A1* | 6/2005 | Kobayashi ...................... 386/52 |
| 2006/0215983 | A1 | 9/2006 | Takeuchi |
| 2010/0008649 | A1* | 1/2010 | Watanabe et al. ............. 386/117 |

FOREIGN PATENT DOCUMENTS

| JP | 2004-266386 | 9/2004 |
| JP | 2005-182864 | 7/2005 |
| JP | 2005-284564 | 10/2005 |

* cited by examiner

*Primary Examiner* — Jeffrey Pwu
*Assistant Examiner* — Helai Salehi
(74) *Attorney, Agent, or Firm* — Wenderoth, Lind & Ponack, L.L.P.

(57) ABSTRACT

The present invention achieves an electronic device that, when copying video data from a high-capacity recording medium to a plurality of low-capacity recording media, prevents the video data from being divided at an unnatural position. With this electronic device, if the amount of space remaining in a copy destination recording medium is less than the size of the scene to be copied, the scene data is copied into a different copy destination recording medium in the case where the amount of time of the scene data that can be copied into the copy destination recording medium is less than or equal to a predetermined amount of time.

6 Claims, 10 Drawing Sheets

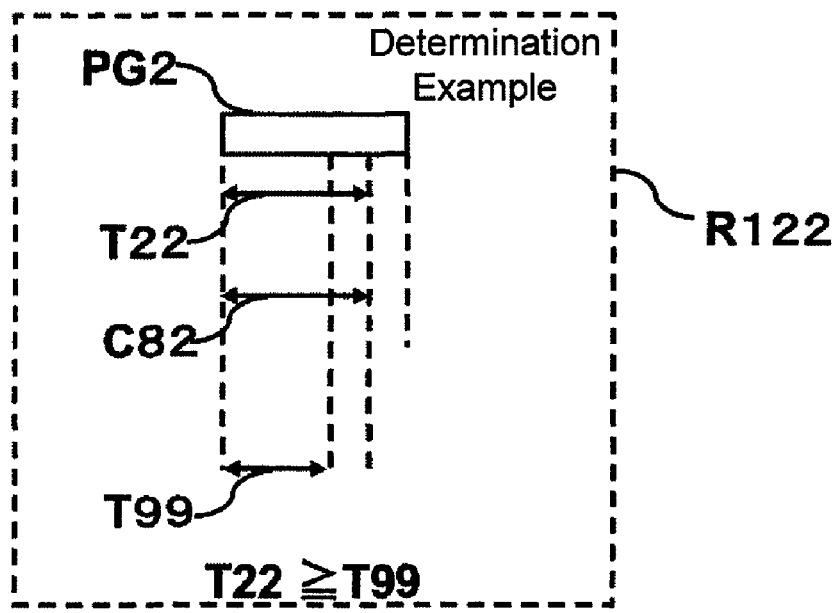
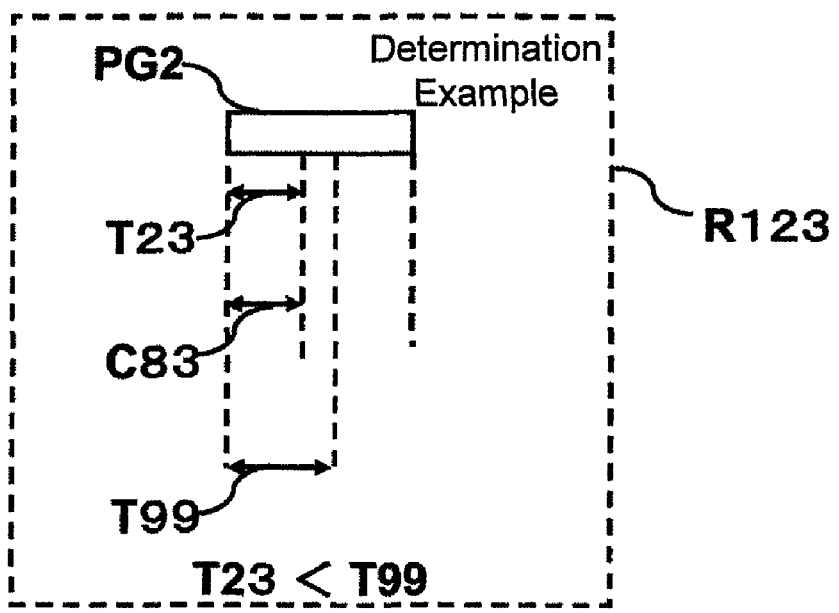
FIG. 9

VIDEO DATA COPYING APPARATUS, VIDEO DATA COPYING METHOD, RECORDING MEDIUM, AND INTEGRATED CIRCUIT

This application claims priority to Japanese Patent Application No. 2007-195383 filed on Jul. 27, 2007. The entire disclosure of Japanese Patent Application No. 2007-195383 filed on Jul. 27, 2007 is hereby incorporated herein by reference.

BACKGROUND OF THE INVENTION

1. Field of the Invention

The present invention relates to a video data copying apparatus, a video data copying method, a recording medium, and an integrated circuit for copying video data recorded onto one recording medium to another recording medium.

2. Description of the Related Art

Semiconductor recording memories such as SD memory cards, optical disks such as DVDs and BDs, magnetic recording media such as video cassettes, and so on are all examples of recording media onto which video data can be recorded. Furthermore, HDDs are also recording devices onto which video data can be recorded. The recording capacity of such recording media and recording devices covers a range spanning from several MB (megabytes) to several TB (terabytes). Therefore, when copying large amounts of video data that have been recorded into a high-capacity recording medium onto a low-capacity recording medium, there are cases where all of the video data on the copy origin cannot be copied onto the copy destination recording medium.

Accordingly, there is a technique whereby when data is copied in such a manner, the video data in the copy origin is automatically divided so that it can be recorded onto the copy destination recording medium, thereby implementing automatic copying from a single high-capacity recording medium to plural low-capacity recording media (for example, see Patent Document 1: JP 2005-182864A). Such video data copying is carried out as long as there is space remaining in the copy destination recording medium, and when there is no space remaining in the copy destination recording medium, information indicating the point to which the video data has been copied is recorded in the copy origin recording medium; based on this information, the remaining video data that has not yet been copied is detected, and that part of the video data is divided off and copied into another recording medium.

Through this, it is possible to provide an electronic device capable of copying video data of a size greater than the capacity of a copy destination recording medium to plural copy destination recording media, whereby the user does not need to pay any particular attention to the division of the video data.

However, according to the abovementioned technique, the copy origin video data is divided based only on whether or not it will fit in the space remaining in the copy destination recording medium, and when scenes and the like of the video data are considered, there is a problem in that the divided video data may be split at an unnatural position in a scene. Here, "scene" refers, in the case of video data captured, for example, by an imaging apparatus, to a series of data that is semantically connected, such as video data spanning from when a record start button has been pressed at the time of capturing to when a record stop button is pressed thereafter. Consider, for example, a case where video data captured by an imaging apparatus is recorded into an SD memory card mounted in the imaging apparatus. In such a case, when the record start button is pressed, the record stop button is then pressed after imaging has been carried out for a predetermined amount of time, the record start button is once again pressed, and the record stop button is again pressed after imaging has been carried out for a predetermined amount of time, the video data recorded in the SD memory card mounted in the imaging apparatus will include two scenes.

Having been conceived in light of the aforementioned problems, it is an object of the present invention to achieve an electronic device including a copying function (a video data copying apparatus), a video data copying method, a recording medium, and a integrated circuit that can, when copying video data from a high-capacity recording medium to a plurality of low-capacity recording media, prevent the video data from being divided at an unnatural position in a scene of the video data.

SUMMARY OF THE INVENTION

A first aspect of the invention is a video data copying apparatus comprising a remaining space reading unit, a scene data amount reading unit, and a control unit.

The remaining space reading unit reads, from a first copy destination recording medium into which video data is to be copied, the remaining recordable space in the first copy destination recording medium. The scene data size reading unit reads, from a copy origin recording medium in which video data composed of a single scene or plural scenes is recorded, the size of copy target scene data, the copy target scene data being the scene data that is to be copied into the first copy destination recording medium. The control unit copies the copy target scene data into a second copy destination recording medium in the case where both the space remaining in the first copy destination recording medium is smaller than the size of the copy target scene data and the playback time of the copy target scene data corresponding to the size of the portion in the first copy destination recording medium into which data can be copied is less than or equal to a first predetermined time.

According to this video data copying apparatus, the control unit copies the copy target scene data into a second copy destination recording medium in the case where both the space remaining in the first copy destination recording medium is smaller than the size of the copy target scene data and the playback time of the copy target scene data corresponding to the size of the portion in the first copy destination recording medium into which data can be copied is less than or equal to a first predetermined time, and therefore it is possible, when copying video data from a high-capacity recording medium to a plurality of low-capacity recording media, to prevent the video data from being divided at an unnatural position in a scene of the video data.

A second aspect of the invention is a video data copying method for copying video data, the method comprising a remaining space reading step, a scene data size reading step, and a control step.

The remaining space reading step reads, from a first copy destination recording medium into which video data is to be copied, the remaining recordable space in the first copy destination recording medium. The scene data size reading step reads, from a copy origin recording medium in which video data composed of a single scene or plural scenes is recorded, the size of copy target scene data, the copy target scene data being the scene data that is to be copied into the first copy destination recording medium. The control step copies the copy target scene data into a second copy destination recording medium in the case where both the space remaining in the first copy destination recording medium is smaller than the size of the copy target scene data and the playback time of the copy target scene data corresponding to the size of the portion in the first copy destination recording medium into which data can be copied is less than or equal to a first predetermined time.

According to this video data copying method, the control step copies the copy target scene data into a second copy destination recording medium in the case where both the space remaining in the first copy destination recording medium is smaller than the size of the copy target scene data and the playback time of the copy target scene data corresponding to the size of the portion in the first copy destination recording medium into which data can be copied is less than or equal to a first predetermined time, and therefore it is possible, when copying video data from a high-capacity recording medium to a plurality of low-capacity recording media, to prevent the video data from being divided at an unnatural position in a scene of the video data.

A third aspect of the invention is the second aspect of the invention, including a first dubbing determination step, a first copy step, a second dubbing determination step, a dubbable time acquisition step, a third dubbing determination step, a fourth dubbing determination step, a specified dubbing time setting step, a second copying step, and a copy non-execution determination step.

The first dubbing determination step determines whether or not the space remaining in the first copy destination recording medium is greater than or equal to the size of the copy target scene data. The first copy step copies the copy target scene data into the first copy destination recording medium in the case where it has been determined, in the first dubbing determination step, that the space remaining in the first copy destination recording medium is greater than or equal to the size of the copy target scene data. The second dubbing determination step determines whether or not a dubbing source scene time, the dubbing source scene time being the playback time of the copy target scene data corresponding to the size of the copy target scene data, is less than or equal to twice the first predetermined time, in the case where it has been determined, in the first dubbing determination step, that the space remaining in the first copy destination recording medium is less than the size of the copy target scene data. The dubbable time acquisition step acquires, as a dubbable time, the playback time of the copy target scene data that corresponds to the size of the portion in the first copy destination recording medium into which data can be copied, in the case where it has been determined, in the second dubbing determination step, that the playback time of the copy target scene data corresponding to the size of the copy target scene data is not less than or equal to twice the first predetermined time. The third dubbing determination step determines whether or not the dubbable time acquired in the dubbable time acquisition step is less than or equal to the first predetermined time. The fourth dubbing determination step determines whether or not a time obtained by subtracting the dubbable time from the dubbing source scene time is less than or equal to the first predetermined time, in the case where it has been determined, in the third dubbing determination step, that the dubbable time is not less than or equal to the first predetermined time. The specified dubbing time setting step sets a specified dubbing time to a value obtained by subtracting the first predetermined time from the dubbing source scene time in the case where it has been determined, in the fourth dubbing determination step, that the time obtained by subtracting the dubbable time from the dubbing source scene time is less than or equal to the first predetermined time, and setting the specified dubbing time to the dubbable time in the case where it has been determined, in the fourth dubbing determination step, that the time obtained by subtracting the dubbable time from the dubbing source scene time is not less than or equal to the first predetermined time. The second copying step copies, into the first copy destination recording medium, the copy target scene data of an amount corresponding to the specified dubbing time set in the specified dubbing time setting step. The copy non-execution determination step determines not to copy the copy target scene data into the first copy destination recording medium in the case where it has been determined, in the second dubbing determination step, that the dubbing source scene time is less than or equal to twice the first predetermined time, or in the case where it has been determined, in the third dubbing determination step, that the dubbable time is less than or equal to the first predetermined time.

According to this video data copying method, the size relationship between the dubbing source scene time and a time that is twice the first predetermined time is determined; the size relationship between the dubbable time and the first predetermined time is determined; and the size relationship between a time obtained by subtracting the dubbable time from the dubbing source scene time and the first predetermined time is determined. Then, according to this video data copying method, it is determined, based on the results of the abovementioned determinations, whether or not to copy the copy target scene data into the first copy destination recording medium; in the case where the copy target scene data is determined to be copied, the playback time of the copy target scene data is made to be greater than the first predetermined time, thus making it possible to copy the copy target scene data into the first copy destination recording medium.

According to this video data copying method, the first predetermined time in particular is set to a time that a user would sense as being an unnatural amount of time, which makes it possible to effectively prevent video data that a user would sense as being unnatural from being copied.

According to this video data copying method, it is possible, when copying video data from a high-capacity recording medium to a plurality of low-capacity recording media, to effectively prevent the video data from being divided at an unnatural position in a scene of the video data.

A fourth aspect of the invention is the third aspect of the invention, further comprising a copy completion determination step of determining whether or not all of the copy target scene data has been copied into the second copy destination recording medium, wherein in the case where it has been determined, in the copy completion determination step, that all of the copy target scene data has not been copied into the second copy destination recording medium, the remaining space reading step, the scene data size reading step, the control step, and the copy completion determination step are repeatedly executed until all of the copy target scene data has been copied into a recording medium other than the second recording medium.

According to this video data copying method, it is possible, even if there are plural copy destination recording media, to prevent, with certainty, the video data from being divided at an unnatural position in a scene of the video data.

A fifth aspect of the invention is a recording medium in which is recorded a program that causes a computer to execute a video data copying method for copying video data, the program causing the computer to execute a remaining space reading step, a scene data size reading step, and a control step.

The remaining space reading step reads, from a first copy destination recording medium into which video data is to be copied, the remaining recordable space in the first copy destination recording medium. The scene data size reading step reads, from a copy origin recording medium in which video data composed of a single scene or plural scenes is recorded, the size of copy target scene data, the copy target scene data being the scene data that is to be copied into the first copy destination recording medium. The control step copies the copy target scene data into a second copy destination recording medium in the case where both the space remaining in the first copy destination recording medium is smaller than the size of the copy target scene data and the playback time of the copy target scene data corresponding to the size of the portion in the first copy destination recording medium into which data can be copied is less than or equal to a first predetermined time.

It is therefore possible to achieve a recording medium on which is recorded a program that demonstrates the same effects as the first aspect of the invention.

A sixth aspect of the invention is a integrated circuit comprising a remaining space reading unit, a scene data amount reading unit, and a control unit.

The remaining space reading unit reads, from a first copy destination recording medium into which video data is to be copied, the remaining recordable space in the first copy destination recording medium. The scene data size reading unit reads, from a copy origin recording medium in which video data composed of a single scene or plural scenes is recorded, the size of copy target scene data, the copy target scene data being the scene data that is to be copied into the first copy destination recording medium. The control unit copies the copy target scene data into a second copy destination recording medium in the case where both the space remaining in the first copy destination recording medium is smaller than the size of the copy target scene data and the playback time of the copy target scene data corresponding to the size of the portion in the first copy destination recording medium into which data can be copied is less than or equal to a first predetermined time.

Through this, it is possible to achieve an integrated circuit that achieves the same effects as the first aspect of the invention.

According to the present invention, it is possible to achieve an electronic device including a copying function (a video data copying apparatus), a video data copying method, a recording medium, and a integrated circuit that can, when copying video data from a high-capacity recording medium to a plurality of low-capacity recording media, prevent the video data from being divided at an unnatural position in a scene of the video data.

BRIEF DESCRIPTION OF THE DRAWINGS

FIG. 9 is a diagram illustrating specific examples of determination F6 (Step F6).

DETAILED DESCRIPTION OF THE INVENTION

A preferred embodiment of the present invention shall be described hereinafter.

First Embodiment

First, an outline of the configuration of an imaging apparatus (an example of a video data copying apparatus) according to the first embodiment of the present invention shall be provided, after which a method for managing audio/video data in a recording medium shall be described. Then, a method for managing the space remaining in a recording medium shall be described, followed by detailed descriptions of only the portions of the imaging apparatus according to the first embodiment of the present invention related to a copying function. Finally, the flow of copying between recording media according to the first embodiment of the present invention shall be described.

<1.1: Configuration of Imaging Apparatus>

Figure 1:
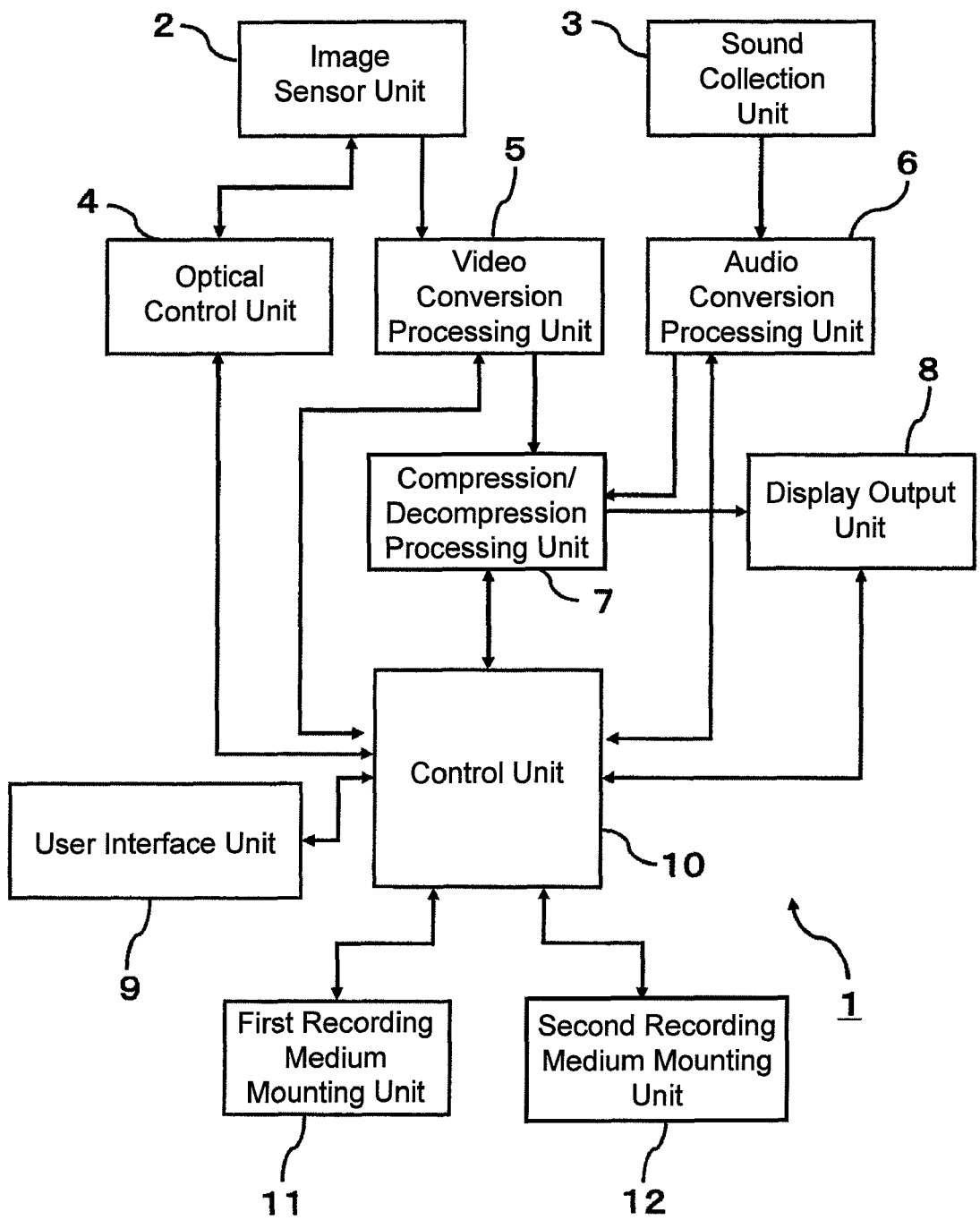
FIG. 1 is a block diagram illustrating the configuration of an imaging apparatus according to a first embodiment of the present invention.

FIG. 1 is a block diagram illustrating the configuration of an imaging apparatus (video data copying apparatus) 1 according to the first embodiment of the present invention.

The imaging apparatus 1 includes an image sensor unit 2, a sound collection unit 3, an optical control unit 4, a video conversion processing unit 5, an audio conversion processing unit 6, a compression/decompression processing unit 7, a display output unit 8, a user interface unit 9, a control unit 10, a first recording medium mounting unit 11, and a second recording medium mounting unit 12.

The image sensor unit 2 is configured of an optical lens group capable of being driven and an image sensor such as a CCD. A light signal that enters the apparatus through the optical lens group is converted into an electric signal by the image sensor, such as a CCD, and the image sensor unit 2 then outputs the electric signal to the video conversion processing unit 5.

The sound collection unit 3 is configured of a plurality of microphone elements. The sound collection unit 3 converts collected sound vibrations into an electric signal and outputs the electric signal to the audio conversion processing unit 6.

The optical control unit 4 controls the driving of the optical lens group of the image sensor unit 2 and so on.

The video conversion processing unit 5 converts the analog electric signal inputted by the image sensor unit 2 into a digital video signal and outputs the digital video signal to the compression/decompression processing unit 7.

The audio conversion processing unit 6 converts the analog electric signal inputted by the sound collection unit 3 into a digital audio signal and outputs the digital audio signal to the compression/decompression processing unit 7.

The compression/decompression processing unit 7 compresses the digital video signal inputted by the video conversion processing unit 5 and the digital audio signal inputted by the audio conversion processing unit 6, thereby generating a compressed audio/video signal (called simply an "audio/video signal" hereinafter), and outputs the audio/video signal to the control unit 10. The compression/decompression processing unit 7 also decompresses an audio/video signal inputted by the control unit 10 and outputs the resultant to the display output unit 8.

The display output unit 8 displays the digital video signal inputted by the compression/decompression processing unit 7 on a screen, and outputs the digital audio signal inputted by the compression/decompression processing unit 7 as audio. "Displaying on a screen" refers to, for example, displaying the digital video signal on a liquid crystal display, whereas "outputting as audio" refers to, for example, outputting the audio signal through a speaker.

The user interface unit 9 accepts input regarding the operation of the imaging apparatus 1 (record start, record stop, zoom in, still-image capturing, playback of recorded video, and so on) made by a user through a remote controller, keys on the apparatus itself, a GUI screen, or the like, and outputs this input information to the control unit 10.

The control unit 10 controls the operation of the optical control unit 4, the video conversion processing unit 5, the audio conversion processing unit 6, the compression/decompression processing unit 7, the display output unit 8, the first recording medium mounting unit 11, and the second recording medium mounting unit 12 in accordance with the input from the user interface unit 9 regarding the operation of the imaging apparatus 1 made by the user, thereby achieving operation of the imaging apparatus according to the input made by the user. The control unit 10 also records the audio/video signal inputted by the compression/decompression processing unit 7 into a first recording medium mounted to the first recording medium mounting unit 11 or a second recording medium mounted to the second recording medium mounting unit 12. Furthermore, the control unit 10 also outputs an audio/video signal inputted from the first recording medium mounted to the first recording medium mounting unit 11 or the second recording medium mounted to the second recording medium mounting unit 12 to the other recording medium or to the compression/decompression processing unit 7.

For example, when an input indicating recording preparation is made through the user interface unit 9 (that is, when information instructing recording preparation has been inputted), the control unit 10 instructs the optical control unit 4 to automatically adjust the focus of the lens group onto a subject. Furthermore, when an input indicating recording to be started is made through the user interface unit 9 (that is, when information instructing recording to be started), the control unit 10 instructs the video conversion processing unit 5 to convert the analog electric signal inputted by the image sensor unit 2 into a digital video signal, instructs the audio conversion processing unit 6 to convert the analog electric signal inputted by the sound collection unit 3 into a digital audio signal, and instructs the compression/decompression processing unit 7 to compress the digital video signal inputted by the video conversion processing unit 5 and the digital audio signal inputted by the audio conversion processing unit 6, thereby generating an audio/video signal; recording of the audio/video signal into the first recording medium or the second recording medium is then started. Recording is started by the imaging apparatus 1 through these operations.

In addition, when an input indicating playback of recorded video is made through the user interface unit 9 (that is, when information instructing the playback of recorded video has been inputted), the control unit 10 reads out the audio/video signal from the first recording medium or the second recording medium, outputs the audio/video signal to the compression/decompression processing unit 7, instructs the compression/decompression processing unit 7 to decompress the audio/video signal, and outputs the decompressed audio/video signal to the display output unit 8, and instructs the display output unit 8 to output the digital video signal inputted by the compression/decompression processing unit 7 on the screen and output the audio signal inputted by the compression/decompression processing unit 7 as audio. Playback of recorded video is started by the imaging apparatus 1 through these operations.

Control performed by the control unit 10 for copying between the first recording medium and the second recording medium shall be described in detail hereinafter.

Although the present embodiment assumes that the first recording medium is an SD memory card and the second recording medium is a DVD, it should be noted that the first recording medium and the second recording medium may both be semiconductor recording memories such as SD memory cards, optical disks such as DVDs or BDs, magnetic recording media such as video cassettes, recording devices such as HDDs.

<1.2: Method for Managing Audio/Video Data in Recording Medium>

Figure 2:
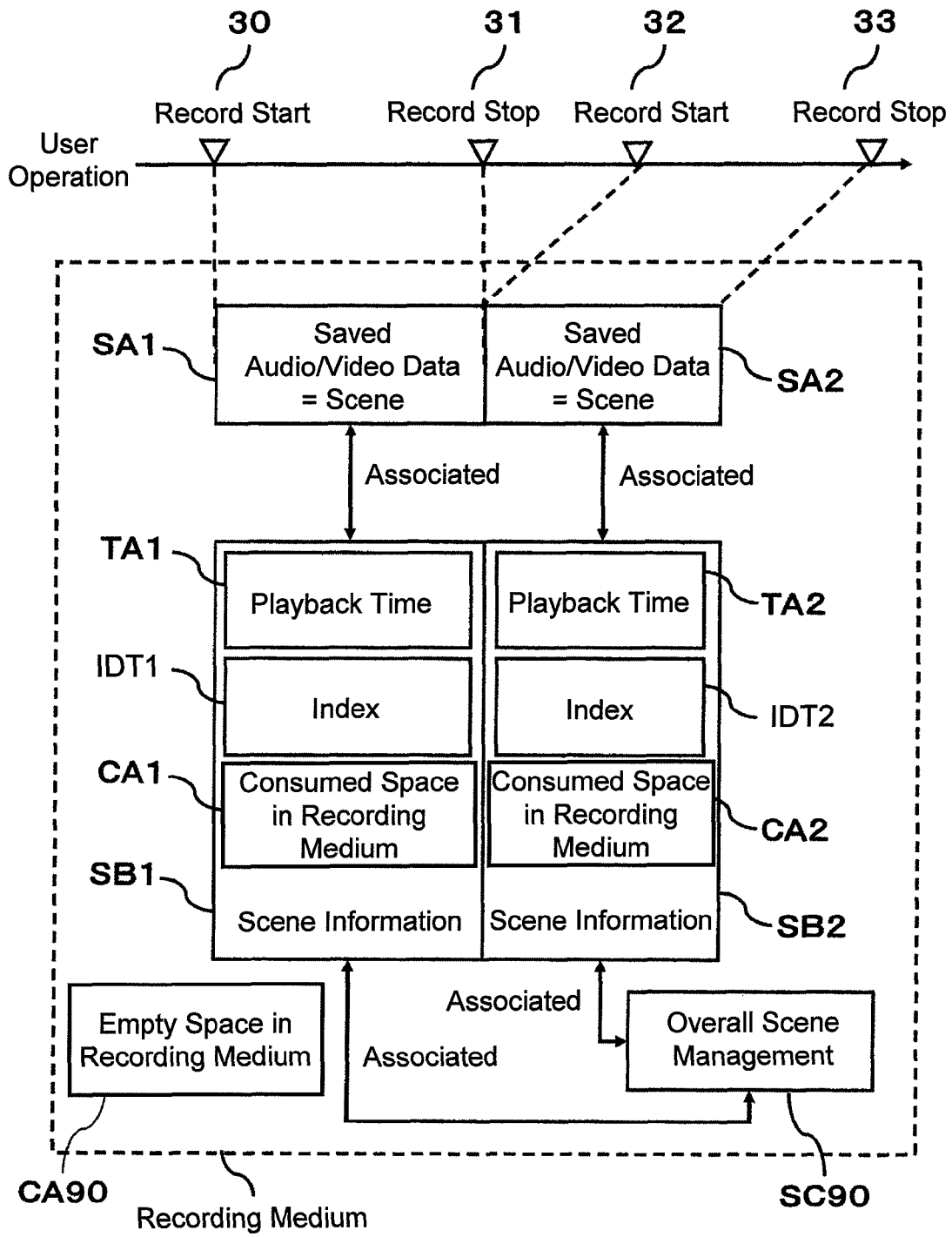
FIG. 2 is a diagram illustrating a management state of audio/video data within a first recording medium.
Figure 3:
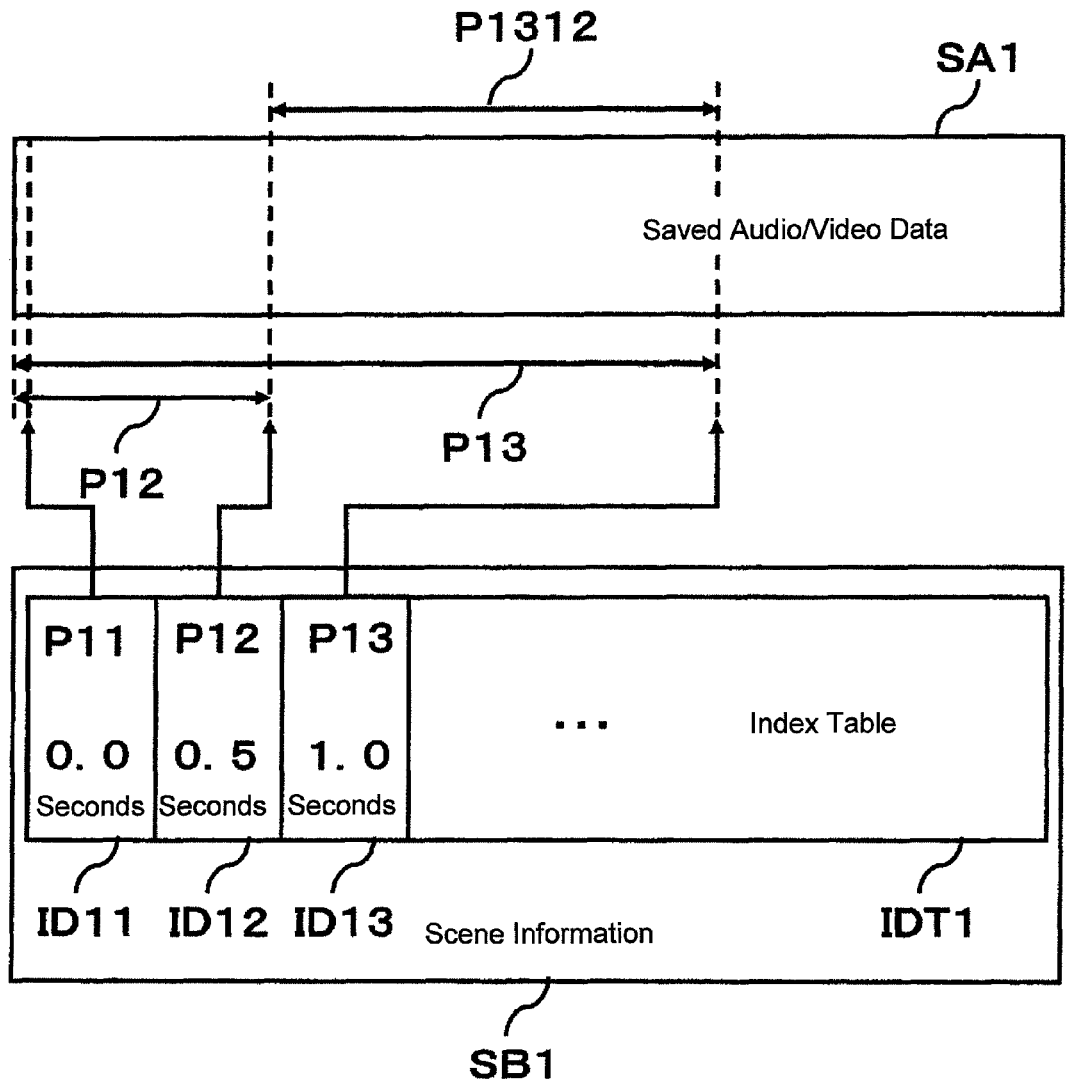
FIG. 3 is a diagram illustrating a relationship between audio/video data and an index table.

FIG. 2 is a diagram illustrating a method for managing the audio/video data in the first recording medium according to the first embodiment of the present invention. Meanwhile, FIG. 3 is a diagram illustrating a relationship between the audio/video data in the first recording medium and an index table of the first recording medium according to the first embodiment of the present invention. A method for managing the audio/video data in the first recording medium according to the first embodiment of the present invention shall be described using FIGS. 1 to 3.

When a record start 30 input is made (that is, when information instructing "record start" (this corresponds to 30 in FIG. 2) has been inputted) through the user interface unit 9, the imaging apparatus 1 starts recording the audio/video signal into the first recording medium or the second recording medium. Audio/video data SA1 is successively recorded into a recording medium in accordance with record start 30.

Next, when a record stop 31 input is made (that is, when information instructing "record stop" (this corresponds to 31 in FIG. 2) has been inputted) through the user interface unit 9, the imaging apparatus 1 stops recording the audio/video data SA1 into the first recording medium or the second recording medium.

Furthermore, when a record start 32 input is made (that is, when information instructing "record start" (this corresponds to 32 in FIG. 2) has been inputted) through the user interface unit 9, the imaging apparatus 1 starts recording the audio/video signal into the first recording medium or the second recording medium. Audio/video data SA2 is successively recorded into a recording medium in accordance with record start 32.

Next, when a record stop 33 input is made (that is, when information instructing "record stop" (this corresponds to 33 in FIG. 2) has been inputted) through the user interface unit 9, the imaging apparatus 1 stops recording the audio/video data SA2 into the first recording medium or the second recording medium. In the interval between record stop 31 and record start 32, the imaging apparatus 1 does not record audio/video data into a recording medium.

In the present embodiment, the audio/video data saved in a recording medium during the interval from record start to record stop is defined as a "scene". When audio/video data is saved in a recording medium, scene information is also created at the same time. One piece of scene information is provided for one scene, and the two are saved in the same recording medium. Information of the total playback time for the case where the saved audio/video data is played back at normal speed, information of the space consumed by the saved audio/video data in the recording medium, and information of an index table that manages the reference position every predetermined amount of playback time in the saved audio/video data are included in the scene information. Each piece of scene information is associated by an overall scene management. One overall scene management exists in a single recording medium.

In the example shown in FIG. 2, scene SA1 and scene SA2 are recorded into a recording medium, and scene information SB1 and scene information SB2 are respectively provided for these two scenes. Information of the total playback time TA1 for the case where the saved audio/video data SA1 is played back at normal speed, information of the space consumed CA1 by the saved audio/video data SA1 in the recording medium, and information of an index table IDT1 that manages the reference position every predetermined amount of playback time in the saved audio/video data SA1 are included in the scene information SB1. The scene information SB1 and scene information SB2 are associated by an overall scene management SC90.

A relationship between the index table information and the saved audio/video data shall be described hereinafter using FIG. 3. Indexes allocated every set amount of time of playback of the audio/video data (for example, every 0.5 seconds) are managed in the index table information IDT1. Reference position information of the audio/video data that corresponds to the set amount of time of playback is managed in each index. In FIG. 3, reference position information P11, P12, and P13 are managed in the indexes ID11, ID12, and ID13, respectively. The reference position information indicates where, in the saved audio/video data, the information for every set amount of time of playback is present, and indicates the space consumed from the start of the saved audio/video data.

By using the overall scene management and the scene information, it is possible to obtain playback time information corresponding to a specific location in the audio/video data.

For example, consider the case where the playback time at the point halfway through scene 1 shown in FIG. 2 is obtained.

First, the overall scene management SC90 is referred to. Because the playback time at the point halfway through scene 1 is to be obtained, the scene information SB1 is referred to.

Next, the index table IDT1 of the scene information SB1 is referred to, and the reference position information P11, P12, and so on are then referred to; the index closest to the point halfway through scene 1 is then detected, and what second in the scene that index corresponds to is confirmed. Through this series of operations, it is possible to obtain the playback time at the point halfway through scene 1.

By using the overall scene management and the scene information, it is also possible to obtain a reference position in the audio/video data corresponding to an arbitrary playback time.

For example, consider the case where a reference position is obtained in the audio/video data when they playback time is at 1.0 seconds through scene 1 shown in FIG. 2.

First, the overall scene management SC90 is referred to. Because reference position is to be obtained in the audio/video data when the playback time is at 1.0 seconds through scene 1, the scene information SB1 is referred to. Next, the index ID13, which corresponds to 1.0 seconds through the scene, is referred to in the index table IDT1 of the scene information SB1, and the reference position information P13 of the index ID13 is then obtained. Through this series of operations, a reference position can be obtained in the audio/video data when they playback time is at 1.0 seconds through scene 1.

Because the storage area of the scene information and the overall scene management consume extremely little space, using the scene information and the overall scene management enables effective scene management while also consuming very little storage space.

Figure 4:
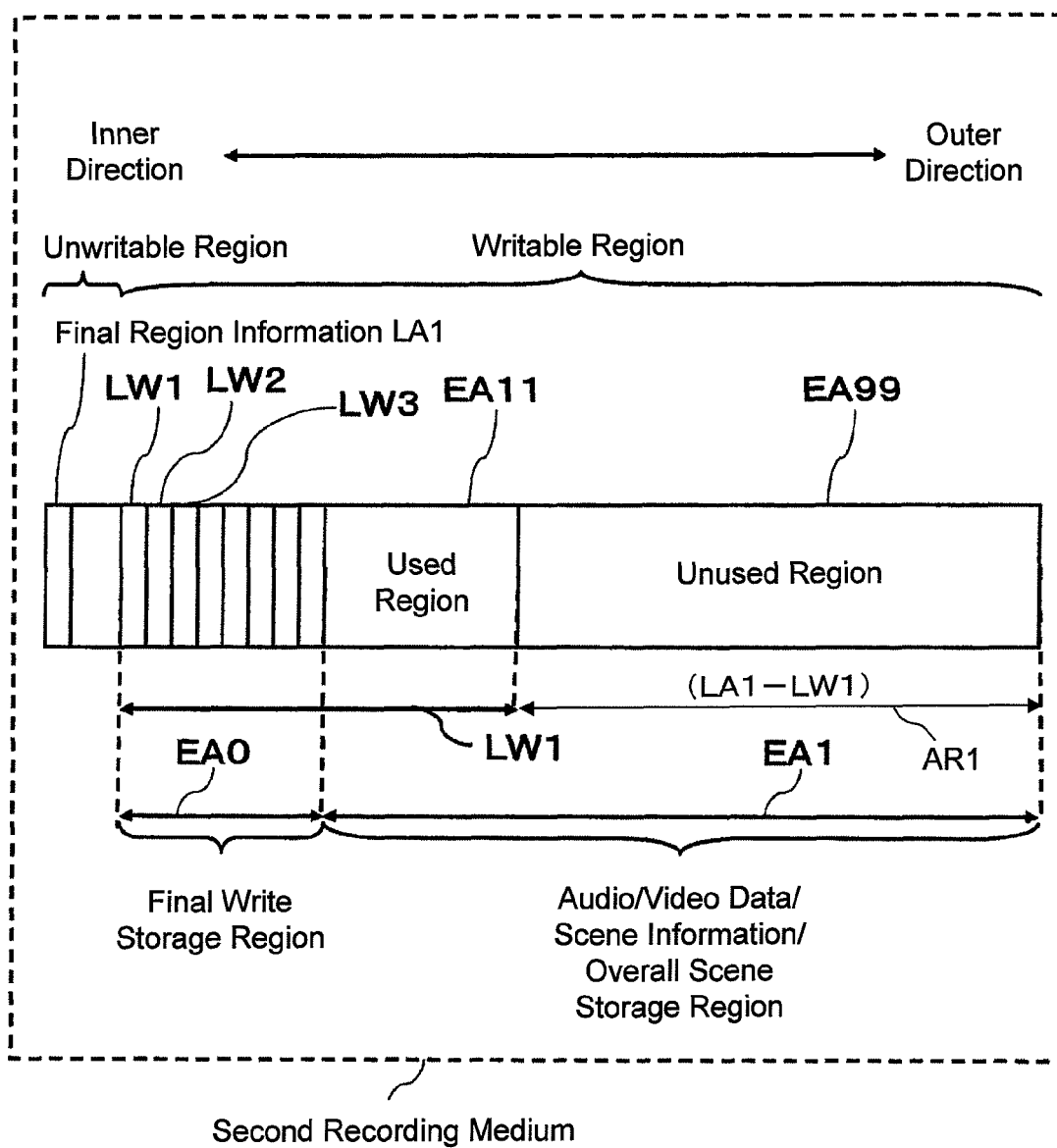
FIG. 4 is a diagram illustrating a method for managing the space remaining in a second recording medium.

FIG. 4 is a diagram illustrating a method for managing the space remaining in a recording medium. In the present embodiment, the second recording medium is assumed to be a standard write-once type DVD disk. With a write-once type DVD disk, an unwritable region and a writable region exist in the recording medium. Information indicating invariable characteristics of the recording medium is written into the unwritable region, whereas various types of data, including audio/video data, can be saved in the writable region. Final region information LA1 is saved in the unwritable region. The final region information LA1 determines the overall capacity of the recording medium.

The writable region is further classified into a final write storage region EA0 and an audio/video data/scene information/overall scene storage region EA1. The final write storage region EA0 is split up into plural sections LW1, LW2, LW3, and so on, which are of a set size. The audio/video data/scene information/overall scene storage region EA1 is uniquely written into the write-once type DVD disk in the direction from the inner side of the disk to the outer side of the disk.

In the example in FIG. 4, a used region EA11 is present within the audio/video data/scene information/overall scene storage region EA1, and it is assumed that information of the region written into at the end of the used region EA11 is saved in the section LW1. In this case, the capacity of the unrecorded region can be calculated by subtracting the section LW1 of the final write storage region EA0 from the final region information LA1. In other words, in FIG. 4, the capacity indicated by the two-directional arrow AR1 is the capacity of the unrecorded region (=LA1−LW1). The empty space in the recording medium is equivalent to empty space CA90 in the recording medium as indicated in FIG. 2.

<1.3: Primary Elements Related to Copying Function of Imaging Apparatus 1 and Operations of Those Elements>

Figure 5:
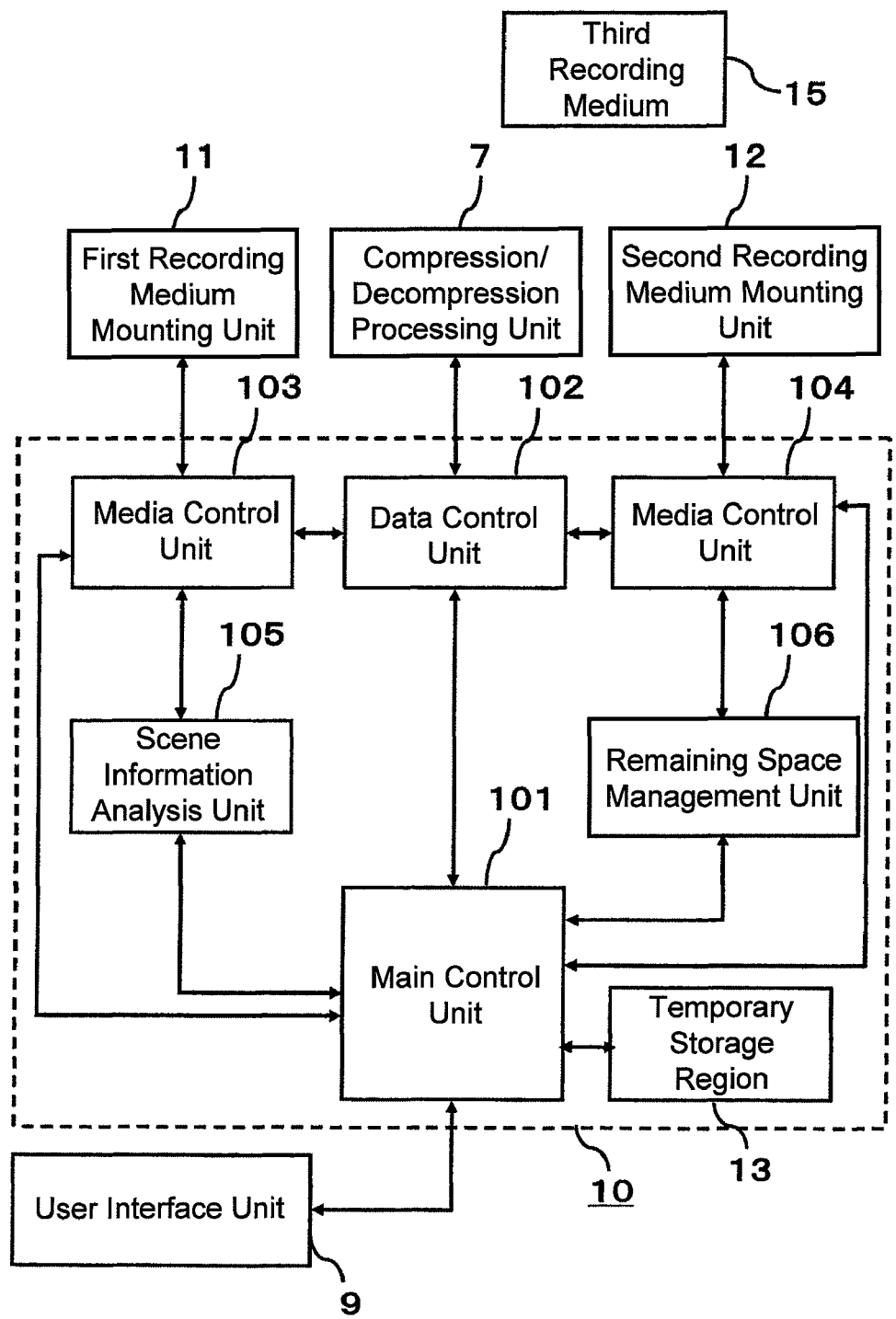
FIG. 5 is a block diagram illustrating the configuration regarding copying according to the first embodiment.

FIG. 5 is a diagram illustrating the control unit 10 and the like of FIG. 1 in more detail. The primary elements related to the copying function of the imaging apparatus 1 of the present embodiment and the operations of those elements shall be described using FIG. 5.

A data control unit 102 can output an audio/video signal inputted by the compression/decompression processing unit 7 to a media control unit 103 or a media control unit 104. Similarly, the data control unit 102 can output audio/video data inputted by the media control unit 103 or the media control unit 104 to the compression/decompression processing unit 7. Furthermore, the data control unit 102 can output audio/video data inputted by the media control unit 103 or the media control unit 104 to the other media control unit. It should be noted that because the data control unit 102 does not compress/decompress the audio/video signal, no loss arises due to the data transfer of this audio/video signal.

The media control unit 103 can control the first recording medium mounted to the first recording medium mounting unit 11, and can also output the audio/video signal inputted by the data control unit 102 to the first recording medium. The media control unit 103 can also output the audio/video signal inputted by the first recording medium to the data control unit 102.

The media control unit 104 can control the second recording medium mounted to the second recording medium mounting unit 12, and can also output the audio/video signal inputted by the data control unit 102 to the second recording medium. The media control unit 104 can also output the audio/video signal inputted by the second recording medium to the data control unit 102.

A scene information analysis unit 105 is a functional unit that analyzes scene information corresponding to an arbitrary scene in the first recording medium, and can output recording medium consumed space information regarding the space an arbitrary section of playback in the arbitrary scene consumes to a main control unit 101. Operations of the scene information analysis unit 105 shall be described using, as an example, a case where the main control unit 101 has requested, from the scene information analysis unit 105, the space consumed in the recording medium spanning from 0.5 seconds to 1.0 seconds in the audio/video data SA1.

The scene information analysis unit 105 analyzes the overall scene management SC90 shown in FIG. 2 via the media control unit 103, and searches the index table IDT1 in the scene information SB1 of the saved audio/video data SA1, which is the specific scene instructed by the main control unit 101. A recording medium consumed space P13 spanning from 0.0 seconds to 1.0 seconds of the audio/video data is acquired from the index ID13 included in the index table IDT1, and a recording medium consumed space P12 spanning from 0.0 seconds to 0.5 seconds of the audio/video data is acquired from the index ID12 included in the index table IDT1; by subtracting P12 from P13, a recording medium consumed space P1312, spanning from 0.5 seconds to 1.0 seconds, is acquired.

A remaining space management unit 106 is a functional unit that manages/calculates the empty space in the second recording medium, and can notify the main control unit 101 of the empty space in the second recording medium through the media control unit 104. A method by which the remaining space management unit 106 calculates the space remaining in the second recording medium shall be described using FIG. 4.

The remaining space management unit 106 acquires the final region information LA1 and the final write storage region EA0.

The remaining space management unit 106 then subtracts, from the final region information LA1 (LA1 corresponds to the total recording capacity of the second recording medium), the section LW1 of the final write storage region EA0 (that is, information LW1 indicating the space in the writable region stored in the section LW1 that is being used), thereby calculating the empty space (=LA1−LW1) in the second recording medium.

The main control unit 101 controls the data control unit 102, the media control unit 103, the media control unit 104, the scene information analysis unit 105, the remaining space management unit 106, and a temporary storage region 13, thereby implementing the recording of audio/video into the first recording medium or the second recording medium, copying between recording media, and the like as carried out by the imaging apparatus 1. The main control unit 101 can also instruct the scene information analysis unit 105 to acquire the scene information corresponding to a scene that the user wishes to copy, and receive the results of the instruction (that is, the scene information corresponding to the scene the user wishes to copy). In addition, the main control unit 101 can also instruct the remaining space management unit 106 to acquire the space remaining in the second recording medium, and receive the results of the instruction (that is, information regarding the space remaining in the second recording medium). Furthermore, the main control unit 101 compares the consumed space in the recording medium according to the scene information inputted by the scene information analysis unit 105 with the space remaining in the recording medium inputted by the remaining space management unit 106, and determines whether or not the specific scene saved in the first recording medium can be copied into the second recording medium. The main control unit 101 can also instruct the media control unit 103 to output, to the data control unit 102, audio/video data of an arbitrary section in an arbitrary scene recorded in the first recording medium analyzed by the scene information analysis unit 105. The main control unit 101 can also transfer, to the media control unit 104, audio/video data inputted to the data control unit 102 by the media control unit 103. The main control unit 101 can also instruct the media control unit 104 to write the audio/video data inputted by the data control unit 102.

The temporary storage region 13 is a temporary storage region capable of saving various types of data handled by the main control unit 101. The content stored in the temporary storage region 13 (stored content) is retained as long as the imaging apparatus 1 is not turned off or the main control unit 101 does not intentionally delete the stored content from the temporary storage unit 13.

<1.4: Specifics of Copy Operations>

The specifics of the copy operations shall be described hereinafter using FIGS. 6 to 10.

Figure 6:
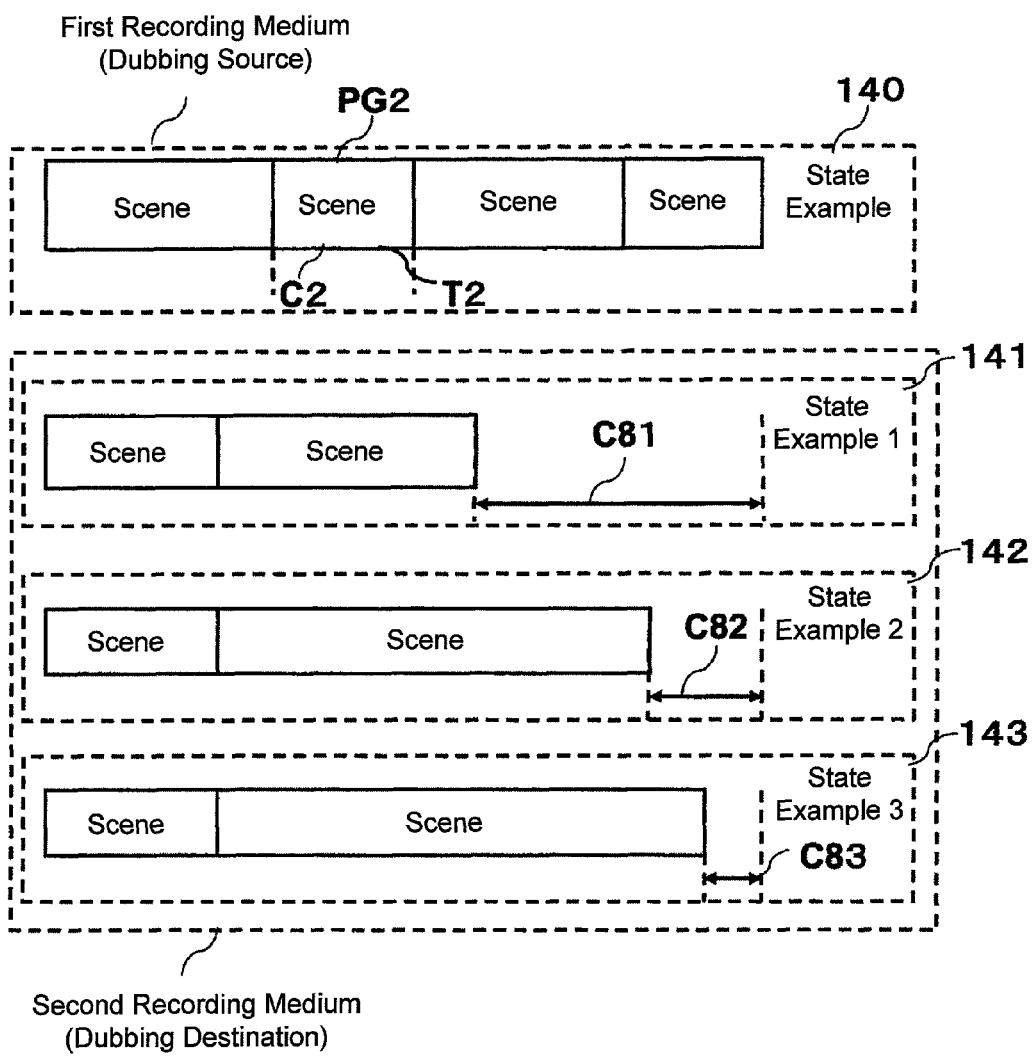
FIG. 6 is a diagram illustrating a specific example of the internal state of a recording medium prior to copying.

FIG. 6 illustrates an example of the internal states of the first recording medium, which is the copy origin recording medium, and the second recording medium, which is the copy destination recording medium.

Internal state 140 indicates the internal state of the first recording medium, where a plurality of scenes are saved, and indicates a scene PG2 that holds scene information of consumed space C2 in the recording medium as well as playback time T2. In the present embodiment, it is assumed that the scene PG2 is copied into the second recording medium.

Internal states 141, 142, and 143 indicate the internal state of the second recording medium, and in FIG. 6, three types of internal states are shown as examples. Internal state 141 assumes that a plurality of scenes are stored and that the recording medium has an empty space C81. Internal state 142 assumes that a plurality of scenes are stored and that the recording medium has an empty space C82. Finally, internal state 143 assumes that a plurality of scenes are stored and that the recording medium has an empty space C83.

Figure 7:
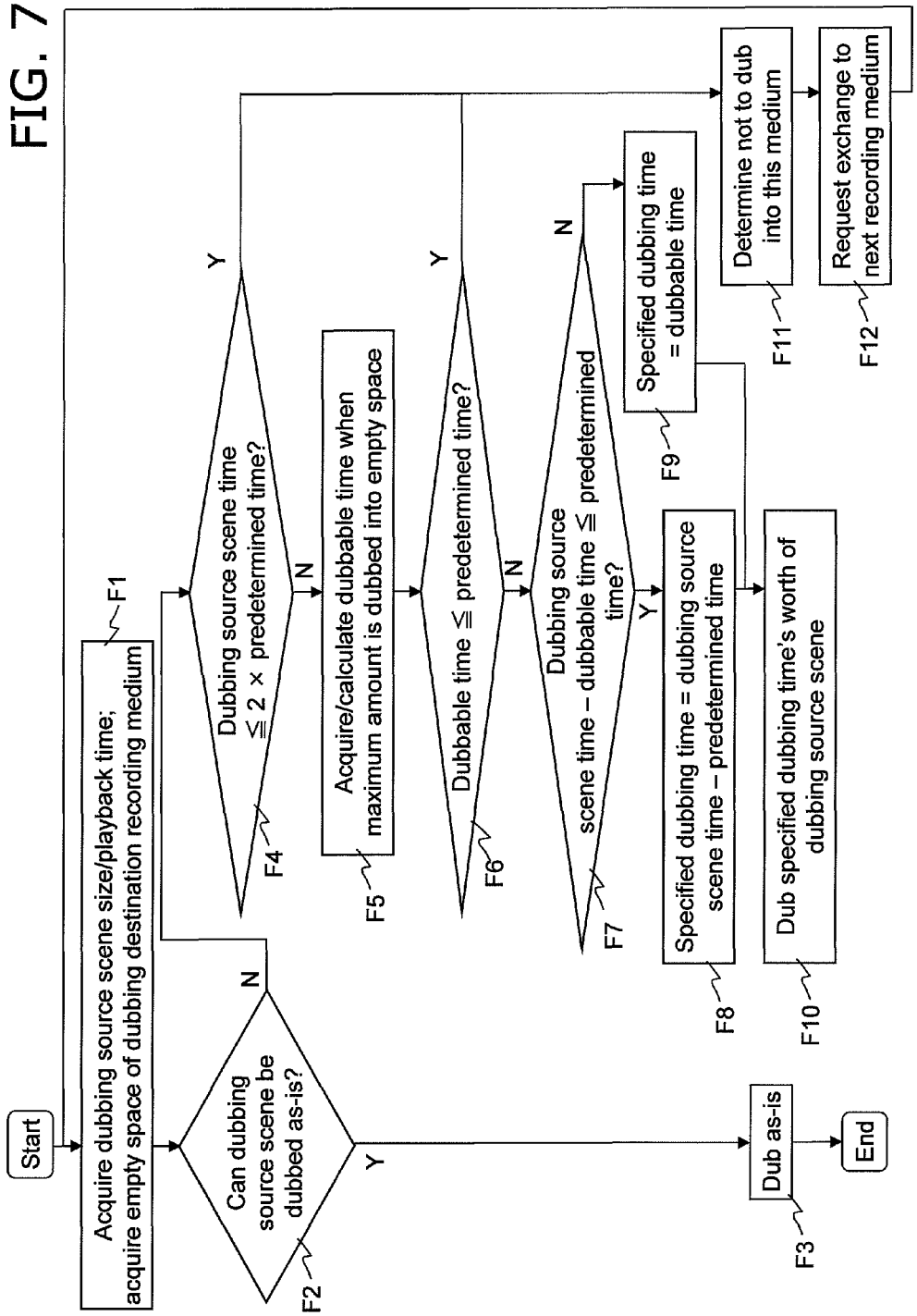
FIG. 7 is a flowchart illustrating control performed by a main control unit 101.

FIG. 7 is a flowchart illustrating the operations performed by the imaging apparatus 1 when the imaging apparatus 1 copies data between the recording media. Descriptions shall be provided regarding operations of the imaging apparatus 1 when the scene PG2 shown in FIG. 6 is copied from the first recording medium to the second recording medium. To be more specific, descriptions shall be provided regarding operations of the imaging apparatus 1 when the scene PG2 is copied from the first recording medium to the second recording medium, for when the internal state of the second recording medium is the internal state 141, 142, or 143.

In process F1 (step F1), the main control unit 101, which has received an instruction to copy the scene PG2 from the user interface unit 9, acquires the consumed space C2 and the playback time T2 of the scene PG2 in the recording medium using the scene information analysis unit 105, the scene PG2 being the scene recorded in the copy origin recording medium that is to be copied. Furthermore, the main control unit 101 acquires the empty space in the second recording medium, which is the copy destination recording medium, using the remaining space management unit 106.

In determination F2 (step F2), the main control unit 101 determines whether or not it is possible to copy the entire scene that is to be copied and that is recorded in the copy origin recording medium into the copy destination recording medium. To be more specific, in the case where the consumed space C2 of the scene PG2 that is to be copied as acquired in process F1 (step F1) is less than or equal to the empty space in the second recording medium, the main control unit 101 determines that it is possible to copy the entire scene PG2 into the second recording medium. However, in the case where the consumed space C2 of the scene PG2 that is to be copied as acquired in process F1 (step F1) is greater than the empty space in the second recording medium, the main control unit 101 determines that it is not possible to copy the entire scene PG2 into the second recording medium. The procedure moves to process F3 (step F3) if it has been determined that copying is possible, whereas the procedure moves to determination F4 (step F4) if it has been determined that copying is not possible.

Figure 8:
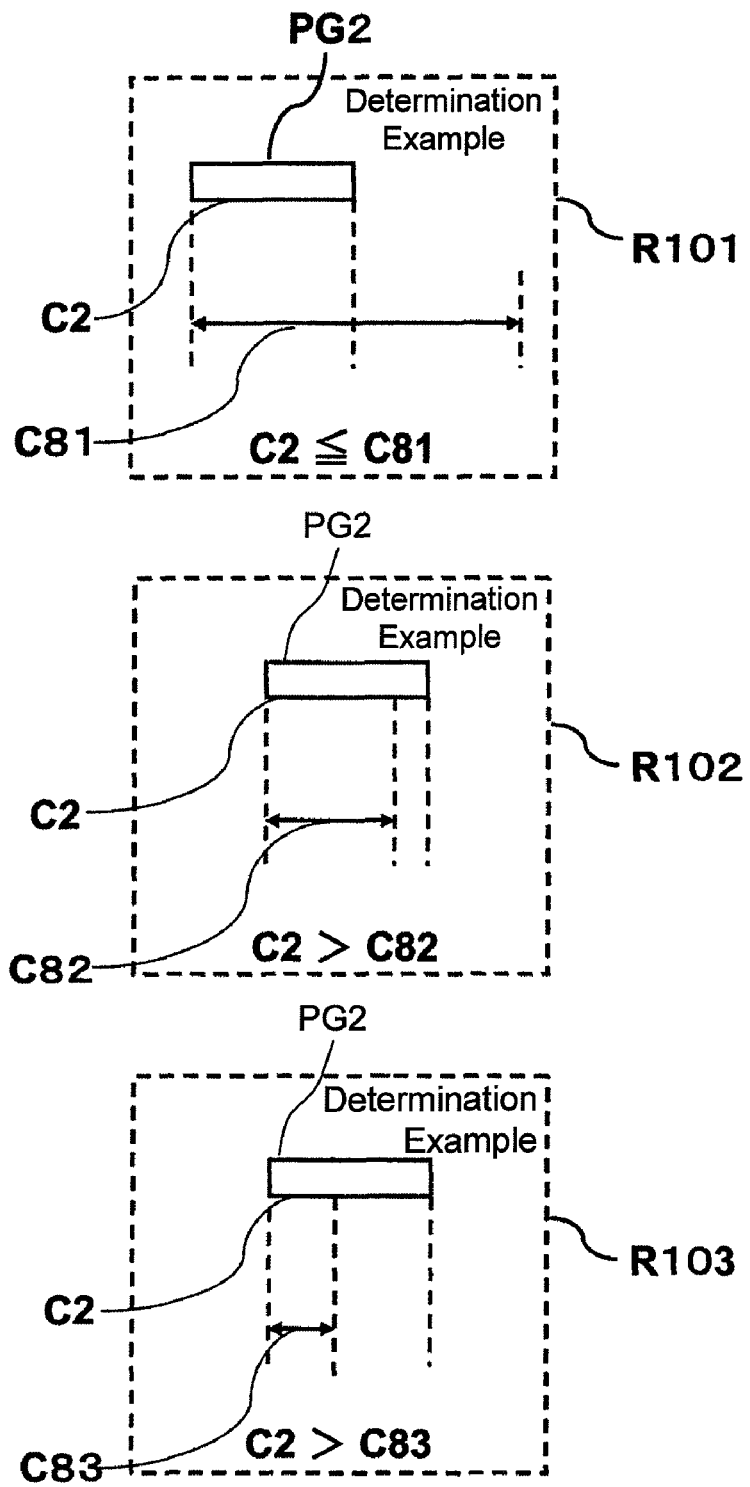
FIG. 8 is a diagram illustrating specific examples of determination F2 (Step F2).

Here, in the case where the internal state of the second recording medium is internal state 141, C2 is smaller than empty space C81 in the second recording medium, as shown in the determination example R101 in FIG. 8; therefore, it is determined that the entire scene PG2 can be copied into the second recording medium. However, in the case where the internal state of the second recording medium is internal state 142, C2 is greater than empty space C82 in the second recording medium, as shown in the determination example R102 in FIG. 8; therefore, it is determined that the entire scene PG2 cannot be copied into the second recording medium. Finally, in the case where the internal state of the second recording medium is internal state 143, C2 is greater than empty space C83 in the second recording medium, as shown in the determination example R103 in FIG. 8; therefore, it is determined that the entire scene PG2 cannot be copied into the second recording medium.

In process F3 (step F3), the main control unit 101 instructs the media control unit 103, the media control unit 104, and the data control unit 102 to copy the scene PG2 into the second recording medium; the audio/video data output from the media control unit 103 is outputted to the media control unit 104 via the data control unit 102, and the copy is executed. After process F3 (step F3) has been executed, the copy processing sequence ends.

In determination F4 (step F4), the main control unit 101 determines that the scene PG2 is not to be copied into the second recording medium in the case where the playback time T2 of the scene PG2 is less than or equal to a second predetermined time. However, the main control unit 101 does not determine that the scene PG2 is not to be copied into the second recording medium in the case where the playback time T2 of the scene PG2 exceeds the second predetermined time. For example, in the case where the playback time T2 of the scene PG2 acquired in process F1 (step F1) is less than or equal to a value twice that of a predetermined time T99 (for example, the value twice that of the predetermined time T99 is used as the second predetermined time; details regarding T99 shall be given later), the main control unit 101 determines that the scene PG2 is not to be copied into the second recording medium, and the procedure moves to process F11 (step F1). However, in the case where the playback time T2 of the scene PG2 acquired in process F1 (step F1) exceeds a value twice that of the predetermined time T99, the main control unit 101 does not determine that the scene PG2 is not to be copied into the second recording medium, and the procedure moves to process F5 (step F5). Performing such a determination makes it possible, when the scene that is to be copied is divided and copied across the second recording medium and a third recording medium, to prevent data of an extremely short and thus unnatural playback time from being copied into the third recording medium.

In process F5 (step F5), the main control unit 101 uses the scene information analysis unit 105 to acquire the amount of time that can be copied from the beginning of the scene PG2 in the case where all of the empty space in the second recording medium as acquired in process F1 (step F1) is used. To be more specific, the amount of time that can be copied from the beginning of the scene PG2 is acquired by referring to the index table within the scene information of the scene PG2, referring to the index of the range that will completely fit within the empty space of the second recording medium, and acquiring the time information stored therewithin.

Here, in the case where the internal state of the second recording medium is internal state 142, it is possible to copy playback time T22 from the beginning of the scene PG2 if all of the empty space C82 in the second recording medium is used, as indicated by the determination example R122 in FIG. 9. Similarly, in the case where the internal state of the second recording medium is internal state 143, it is possible to copy playback time T23 from the beginning of the scene PG2 if all of the empty space C83 in the second recording medium is used, as indicated by the determination example R123 in FIG. 9.

In determination F6 (step F6), the main control unit 101 determines not to copy the entire scene that is to be copied into the second recording medium in the case where the amount of time of the scene to be copied that can be copied into the second recording medium is less than or equal to a predetermined amount of time. To be more specific, the main control unit 101 determines whether or not the amount of time starting from the beginning of the scene PG2 that can be copied as acquired in process F5 (step F5) is less than or equal to the predetermined time T99. This predetermined time T99 is, for example, 10 seconds. It is preferable to use, as this time, a time that a user would sense as being an unnatural amount of time if part of a scene of this time had been divided off and recorded into an arbitrary recording medium. The predetermined time 99 may be determined in the imaging apparatus 1 in advance and incorporated into the program thereof; alternatively, the configuration may be such that the user can set an arbitrary value for this time. In the case where the results of the determination performed in step F6 indicate that the amount of time starting from the beginning of the scene PG2 that can be copied as acquired in process F5 (step F5) is less than or equal to the predetermined time T99, the main control unit 101 determines not to copy the entire scene that is to be copied into the second recording medium, and the procedure moves to process F11 (step F1). However, in the case where the amount of time starting from the beginning of the scene PG2 that can be copied as acquired in process F5 (step F5) is greater than the predetermined time T99, the main control unit 101 determines to copy part of the scene that is to be copied into the second recording medium, and the procedure moves to determination F7 (step F7). Performing such a determination makes it possible, when the scene that is to be copied is divided and copied across the second recording medium and the third recording medium, to prevent data of an extremely short and thus unnatural playback time from being copied into the second recording medium.

Here, in the case where the internal state of the second recording medium is internal state 142, the time T22 that can be copied exceeds the predetermined time T99, and thus it is determined to copy the entirety of the time that can be copied or to divide the time that can be copied and copy part of that time into the second recording medium, as indicated by determination example R122 in FIG. 9. However, in the case where the internal state of the second recording medium is internal state 143, the time T22 that can be copied is less than or equal to the predetermined time T99, and thus it is determined not to perform the copy into the second recording medium, as indicated by determination example R123 in FIG. 9.

If in determination F7 (step F7), the amount of time that can be copied, as acquired/calculated in process F5 (step F5), is copied as-is into the second recording medium, the time that can be taken as the beginning scene in the third recording medium is compared with the predetermined time T99 in order to avoid the problem that a scene of less than the predetermined time T99 is generated at the beginning of the third recording medium. To be more specific, the main control unit 101 determines that it is necessary to correct the time that can be copied in the case where a time obtained by subtracting the time that can be copied from the playback time T2 of the scene PG2 is less than or equal to the predetermined time T99. The procedure then moves to process F8 (step F8). However, the main control unit 101 determines that it is not necessary to correct the time that can be copied in the case where the time obtained by subtracting the time that can be copied from the playback time T2 of the scene PG2 exceeds the predetermined time T99. The procedure then moves to process F9 (step F9).

In process F8 (step F8), the time that can be copied is corrected in accordance with the results of the determination performed in determination F7 (step F7), and a specified time for copying is calculated. For example, the main control unit 101 abandons the time that can be copied as acquired/calculated in process F5 (step F5) and uses a time obtained by subtracting the predetermined time T99 from the playback time T2 of the copy origin scene PG2 as the specified time for copying.

In process F9 (step F9), the time that can be copied is used as-is as the specified time for copying, in accordance with the results of the determination performed in determination F7 (step F7).

In process F10 (step F10), the main control unit 101 instructs the media control unit 103, the media control unit 104, and the data control unit 102 to copy, into the second recording medium, the amount of the scene PG2 that corresponds to the specified time for copying determined in process F8 (step F8) or process F9 (step F9).

In process F11 (step F11), the main control unit 101 determines that no more of the scene is to be copied into the second recording medium.

After the execution of process F10 (step F10) or process F11 (step F11), the procedure moves to process F12 (step F12). In process F12 (step F12), the control unit 10 saves information indicating how far the copying proceeded in the temporary storage region 13. Furthermore, using the display output unit 8, the main control unit 101 requests that the user exchange the second recording medium for the third recording medium, which is the medium to be used next.

Having detected that the third recording medium has been set, the main control unit 101 continues the copying process from process F1 (step F1). The data copied into the third recording medium is the continuation of the scene PG2 copied into the second recording medium. The data copied into the third recording medium is then identified by using the information saved by the main control unit 101 in the temporary storage region 13 (the information indicating how far the copying of the scene PG2 proceeded in the second recording medium). In other words, the data of the scene PG2 copied into the third recording medium is the data of the scene PG2 that was not copied into the second recording medium.

The same processes as described in the above operations are repeated until a factor initiating the end of copying has arisen.

Figure 10:
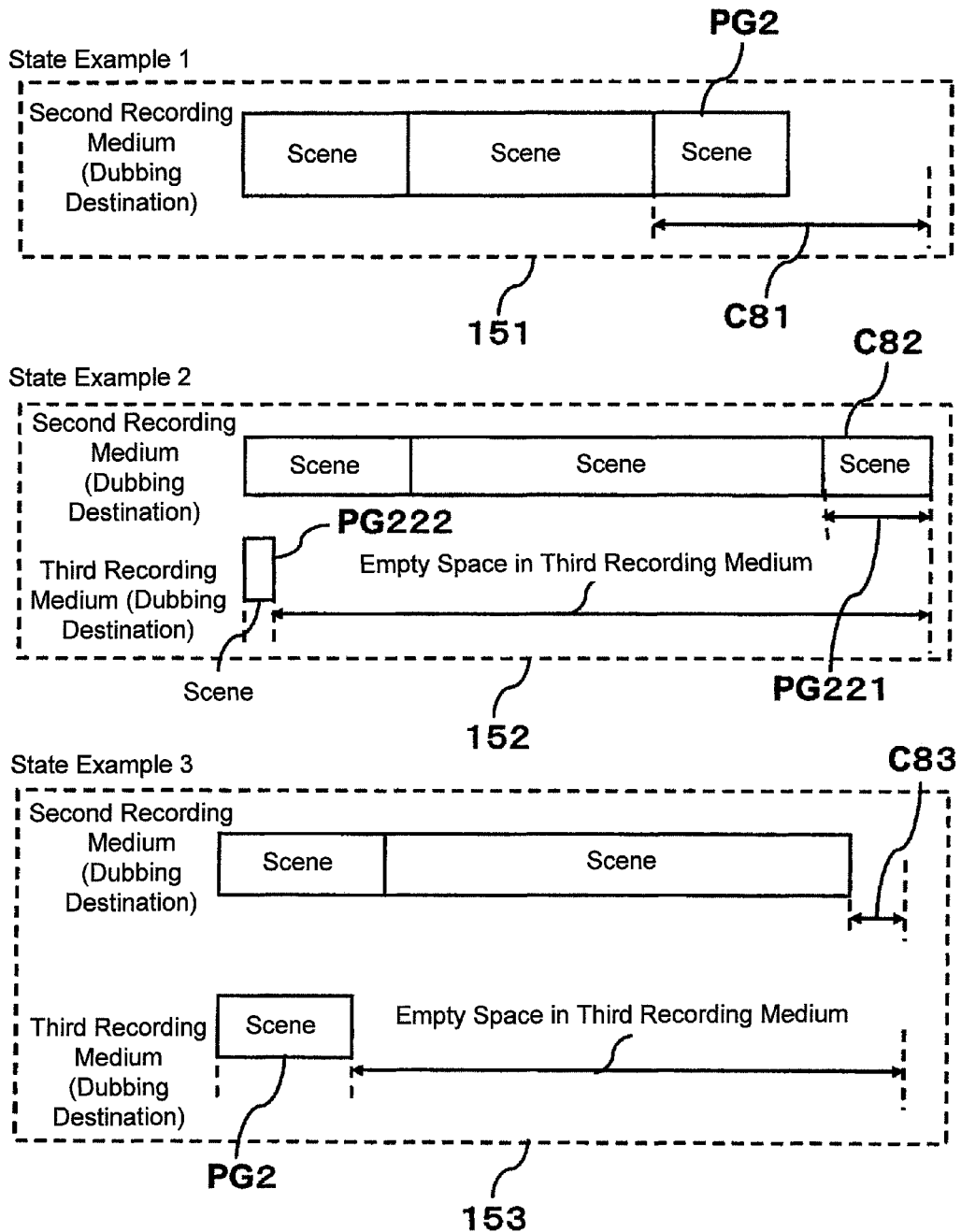
FIG. 10 is a diagram illustrating a specific example of the internal state of a recording medium after copying has been completed.

The states of the recording media when copying has ended are shown in FIG. 10.

Internal state 141 of the second recording medium prior to the start of dubbing has changed to internal state 151 of the second recording medium following the end of copying. Internal state 142 of the second recording medium prior to the start of dubbing has changed to internal state 152 of the second recording medium and the third recording medium following the end of copying. Finally, internal state 143 of the second recording medium prior to the start of dubbing has changed to internal state 153 of the second recording medium and the third recording medium following the end of copying.

According to the imaging apparatus 1, scenes are copied through the process described above (above, the scene PG2 is copied), thereby guaranteeing that PG2 in state example 1, PG221 and PG222 in state example 2, and PG2 in state example 3 of FIG. 10 all have playback times greater than the predetermined time T99. In particular, the imaging apparatus 1 can prevent, with certainty, video data from being divided at an unnatural position in a scene of the video data and copied, by setting the predetermined time T99 to a time that, if the scene was played back, a user would sense as being an unnatural amount of time. Furthermore, with the imaging apparatus 1, whether or not to divide the data during the copy process is determined based not on the amount of data but on the time (playback time), and thus it is possible to prevent, with certainty, the video data from being divided at a position in a scene of the video data that the user will sense as unnatural.

Although the present embodiment assumes that a plurality of recording media are installed within a single device, it should be noted that the present invention can be achieved even if the first recording medium and the second recording medium are not present within the same device. For example, the invention can also be achieved using a configuration where one of the recording media is present within the imaging apparatus 1, the other recording medium is set in an external DVD player, and the DVD player is connected to the imaging apparatus 1.

As described thus far, according to the present invention, it is possible to provide an electronic device including a copying function (a video data copying apparatus), a video data copying method, a recording medium, and a integrated circuit that can, when copying video data from a high-capacity recording medium to a plurality of low-capacity recording media, prevent the video data from being divided at an unnatural position in a scene of the video data.

Other Embodiments

Some or all of the functional blocks that carry out the various processes described in the above embodiments may be achieved through individual single chips; alternatively, some or all of these functional blocks may be implemented collectively using a single chip. It should be noted that here reference is made to LSIs, but depending on the degree of integration, these may also be referred to as ICs, system LSIs, super LSIs, or ultra LSIs.

The integrated circuit is not intended to be limited to the LSI configuration; a dedicated circuit or a generic processor may also be used to implement the integrated circuit. An FPGA (Field Programmable Gate Array), which makes it possible to program the LSI circuit post-production, or a reconfigurable processor, in which the connections, settings, and so on of the circuit cells within the LSI circuit can be reconfigured, may be used as well.

Further, if other technologies that improve upon or are derived from semiconductor technology enable integration technology to replace LSI circuits, then naturally it is also possible to integrate the functional blocks using that technology. Biotechnology applications are one such foreseeable example.

Some or all of the processing of the functional blocks of the above embodiments can be implemented by a program. In such a case, some or all of the processing of the functional blocks in the above embodiments are run by a central processing unit (CPU) on a computer. A program for performing the various processes is stored on a memory device such as a hard disk or a ROM, and is run on the ROM or read to and run on a RAM.

The various processes of the above embodiments may be implemented through hardware or software. These processes may also be implemented through processes in which the software and hardware run integrated with one another. It goes without saying that it is necessary to adjust the timing at which to execute each process in the case where the image processing device according to the above embodiments is implemented through hardware. For simplicity's sake, the descriptions in the above embodiments have omitted the details regarding the adjustment of the timing of the various signals that arises in the actual hardware architecture.

It should be noted that the specific configuration of the present invention is not intended to be limited to the above embodiments in any way, and various modifications and variations can be made without deviating from the essential spirit of the invention.

Because the present invention can, when copying video data from a high-capacity recording medium to a plurality of low-capacity recording media, prevent the video data from being divided at an unnatural position in a scene of the video data, the present invention is useful in an electronic device including a copying function, and the like.

What is claimed is:

1. A video data copying apparatus comprising:
   a remaining space reading unit that reads, from a first copy destination recording medium into which video data is to be copied, the remaining recordable space in the first copy destination recording medium;
   a scene data size reading unit that reads, from a copy origin recording medium in which video data composed of a single scene or plural scenes is recorded, the size of copy target scene data, the copy target scene data being scene data that is to be copied into the first copy destination recording medium; and
   a control unit that copies the copy target scene data into a second copy destination recording medium in the case where both (i) the remaining recordable space in the first copy destination recording medium is smaller than the size of the copy target scene data and (ii) a playback time of the copy target scene data corresponding to the size of a portion in the first copy destination recording medium into which data can be copied is less than or equal to a first predetermined time.

2. A video data copying method for copying video data, the method comprising:
   using a processor to perform a remaining space reading step of reading, from a first copy destination recording medium into which video data is to be copied, the remaining recordable space in the first copy destination recording medium;
   using the processor to perform a scene data size reading step of reading, from a copy origin recording medium in which video data composed of a single scene or plural scenes is recorded, the size of copy target scene data, the copy target scene data being scene data that is to be copied into the first copy destination recording medium; and
   a control step of copying the copy target scene data into a second copy destination recording medium in the case where both (i) the remaining recordable space in the first copy destination recording medium is smaller than the size of the copy target scene data and (ii) a playback time of the copy target scene data corresponding to the size of a portion in the first copy destination recording medium into which data can be copied is less than or equal to a first predetermined time.

3. The video data copying method according to claim 2, wherein said control step comprises:
   a first dubbing determination step of determining whether or not the remaining recordable space in the first copy destination recording medium is greater than or equal to the size of the copy target scene data;
   a first copy step of copying the copy target scene data into the first copy destination recording medium in the case where it has been determined, in said first dubbing determination step, that the remaining recordable space in the first copy destination recording medium is greater than or equal to the size of the copy target scene data;
   a second dubbing determination step of determining whether or not a dubbing source scene time, the dubbing source scene time being a playback time of the copy target scene data corresponding to the size of the copy target scene data, is less than or equal to twice the first predetermined time, in the case where it has been determined, in said first dubbing determination step, that the remaining recordable space in the first copy destination recording medium is less than the size of the copy target scene data;
   a dubbable time acquisition step of acquiring, as a dubbable time, the playback time of the copy target scene data that corresponds to the size of the portion in the first copy destination recording medium into which data can be copied, in the case where it has been determined, in said second dubbing determination step, that the playback time of the copy target scene data corresponding to the size of the copy target scene data is not less than or equal to twice the first predetermined time;
   a third dubbing determination step of determining whether or not the dubbable time acquired in said dubbable time acquisition step is less than or equal to the first predetermined time;
   a fourth dubbing determination step of determining whether or not a time obtained by subtracting the dubbable time from the dubbing source scene time is less than or equal to the first predetermined time, in the case where it has been determined, in said third dubbing determination step, that the dubbable time is not less than or equal to the first predetermined time;
   a specified dubbing time setting step of setting a specified dubbing time to a value obtained by subtracting the first predetermined time from the dubbing source scene time in the case where it has been determined, in said fourth dubbing determination step, that the time obtained by subtracting the dubbable time from the dubbing source scene time is less than or equal to the first predetermined time, and setting the specified dubbing time to the dubbable time in the case where it has been determined, in said fourth dubbing determination step, that the time obtained by subtracting the dubbable time from the dubbing source scene time is not less than or equal to the first predetermined time;

a second copying step of copying, into the first copy destination recording medium, the copy target scene data of an amount corresponding to the specified dubbing time set in said specified dubbing time setting step; and a copy non-execution determination step of determining not to copy the copy target scene data into the first copy destination recording medium in the case where it has been determined, in said second dubbing determination step, that the dubbing source scene time is less than or equal to twice the first predetermined time, or in the case where it has been determined, in said third dubbing determination step, that the dubbable time is less than or equal to the first predetermined time.

4. The video data copying method according to claim 3, further comprising a copy completion determination step of determining whether or not all of the copy target scene data has been copied into the second copy destination recording medium, wherein in the case where it has been determined, in said copy completion determination step, that all of the copy target scene data has not been copied into the second copy destination recording medium, said remaining space reading step, said scene data size reading step, said control step, and said copy completion determination step are repeatedly executed until all of the copy target scene data has been copied into a recording medium other than the second recording medium.

5. A non-transitory computer-readable recording medium in which is recorded a program that causes a computer to execute a video data copying method for copying video data, wherein, when executed, the program causes the computer to execute a method comprising:

a remaining space reading step of reading, from a first copy destination recording medium into which video data is to be copied, the remaining recordable space in the first copy destination recording medium;

a scene data size reading step of reading, from a copy origin recording medium in which video data composed of a single scene or plural scenes is recorded, the size of copy target scene data, the copy target scene data being scene data that is to be copied into the first copy destination recording medium; and a control step of copying the copy target scene data into a second copy destination recording medium in the case where both (i) the remaining recordable space in the first copy destination recording medium is smaller than the size of the copy target scene data and (ii) a playback time of the copy target scene data corresponding to the size of a portion in the first copy destination recording medium into which data can be copied is less than or equal to a first predetermined time.

6. An integrated circuit comprising:

a remaining space reading unit that reads, from a first copy destination recording medium into which video data is to be copied, the remaining recordable space in the first copy destination recording medium;

a scene data size reading unit that reads, from a copy origin recording medium in which video data composed of a single scene or plural scenes is recorded, the size of copy target scene data, the copy target scene data being scene data that is to be copied into the first copy destination recording medium; and a control unit that copies the copy target scene data into a second copy destination recording medium in the case where both (i) the remaining recordable space in the first copy destination recording medium is smaller than the size of the copy target scene data and (ii) a playback time of the copy target scene data corresponding to the size of a portion in the first copy destination recording medium into which data can be copied is less than or equal to a first predetermined time.

\* \* \* \* \*